H. N. ANDERSON.
GEAR ROLLING MACHINE.
APPLICATION FILED OCT. 15, 1915. RENEWED AUG. 17, 1917.

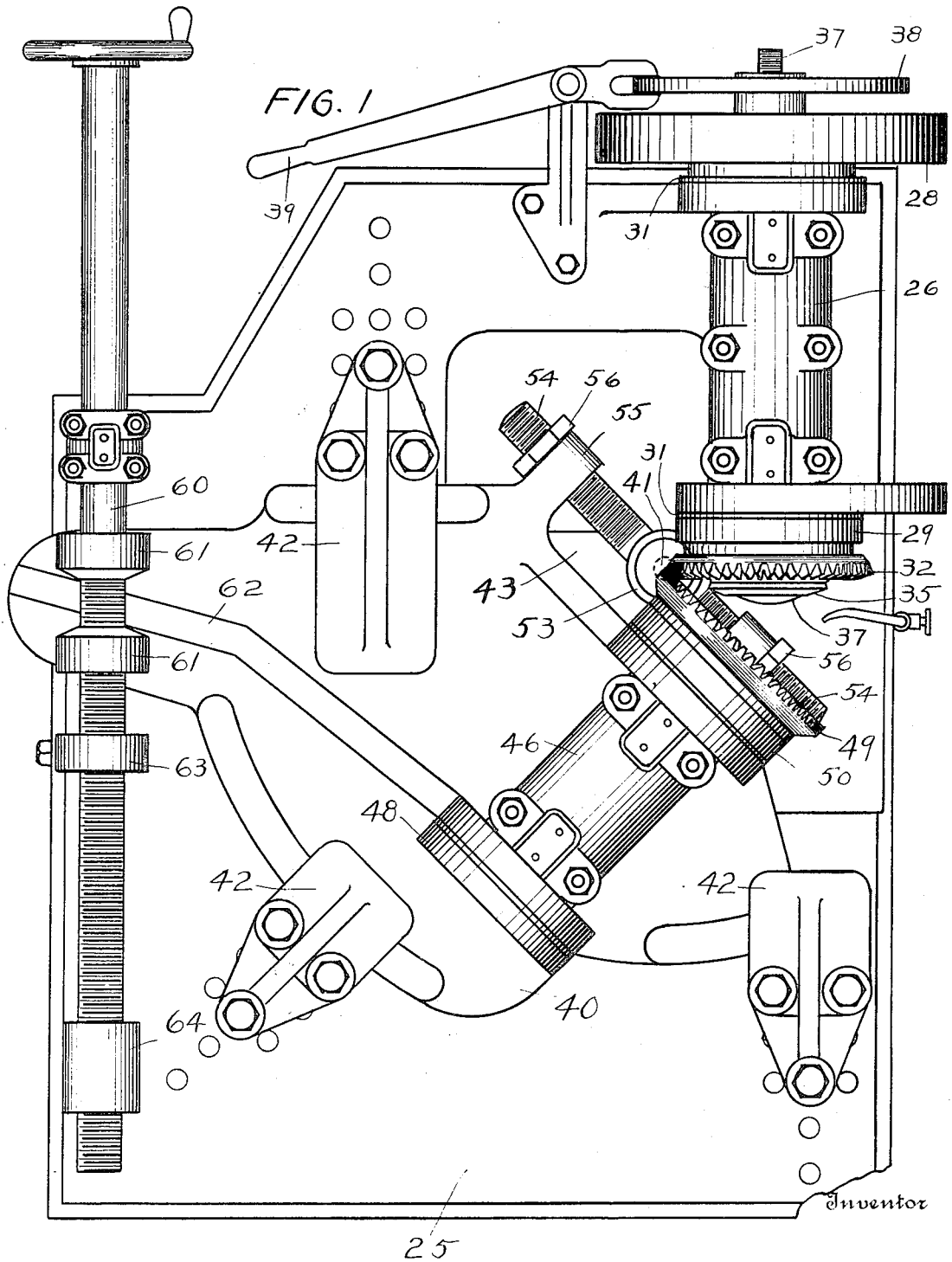

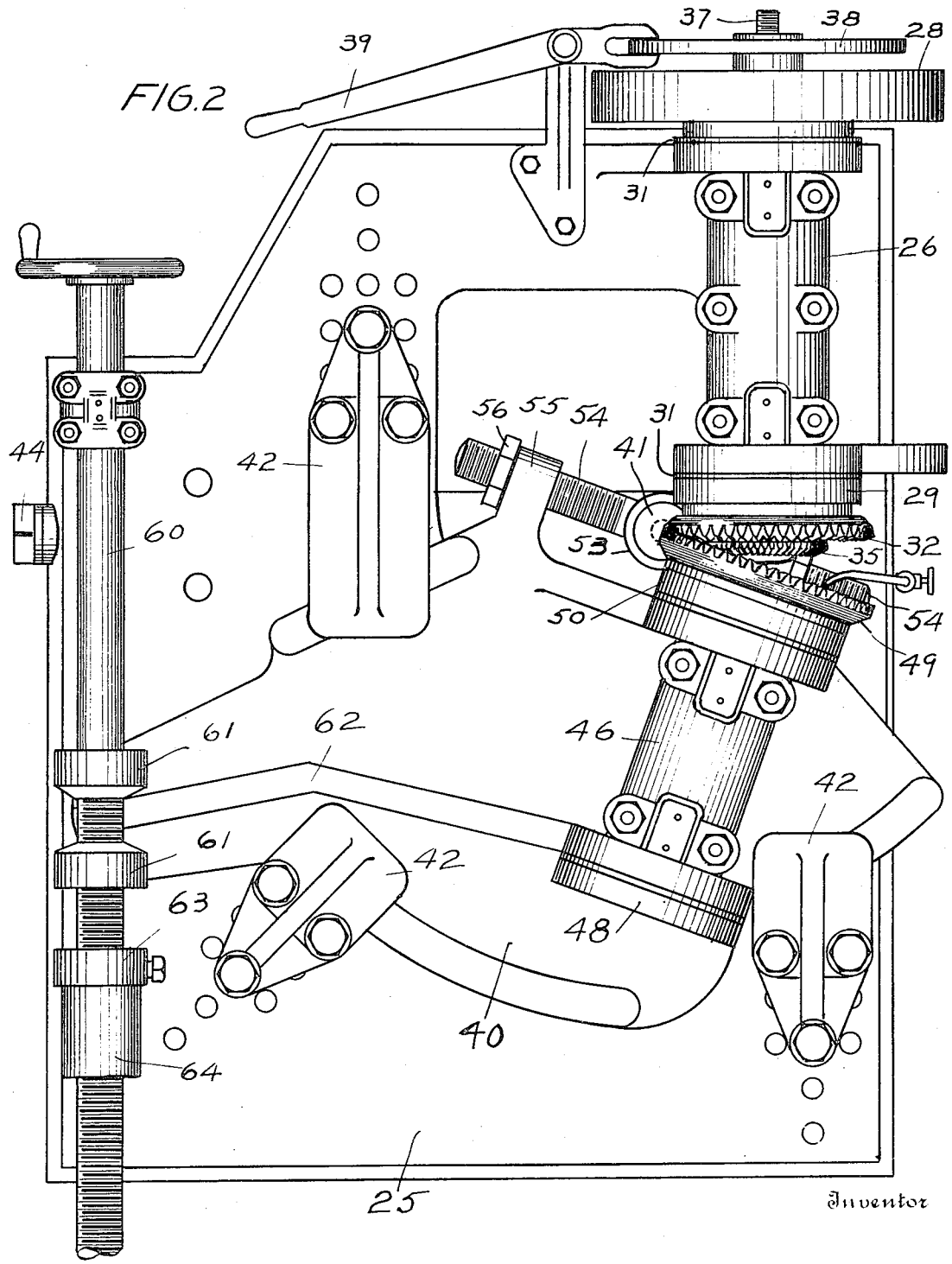

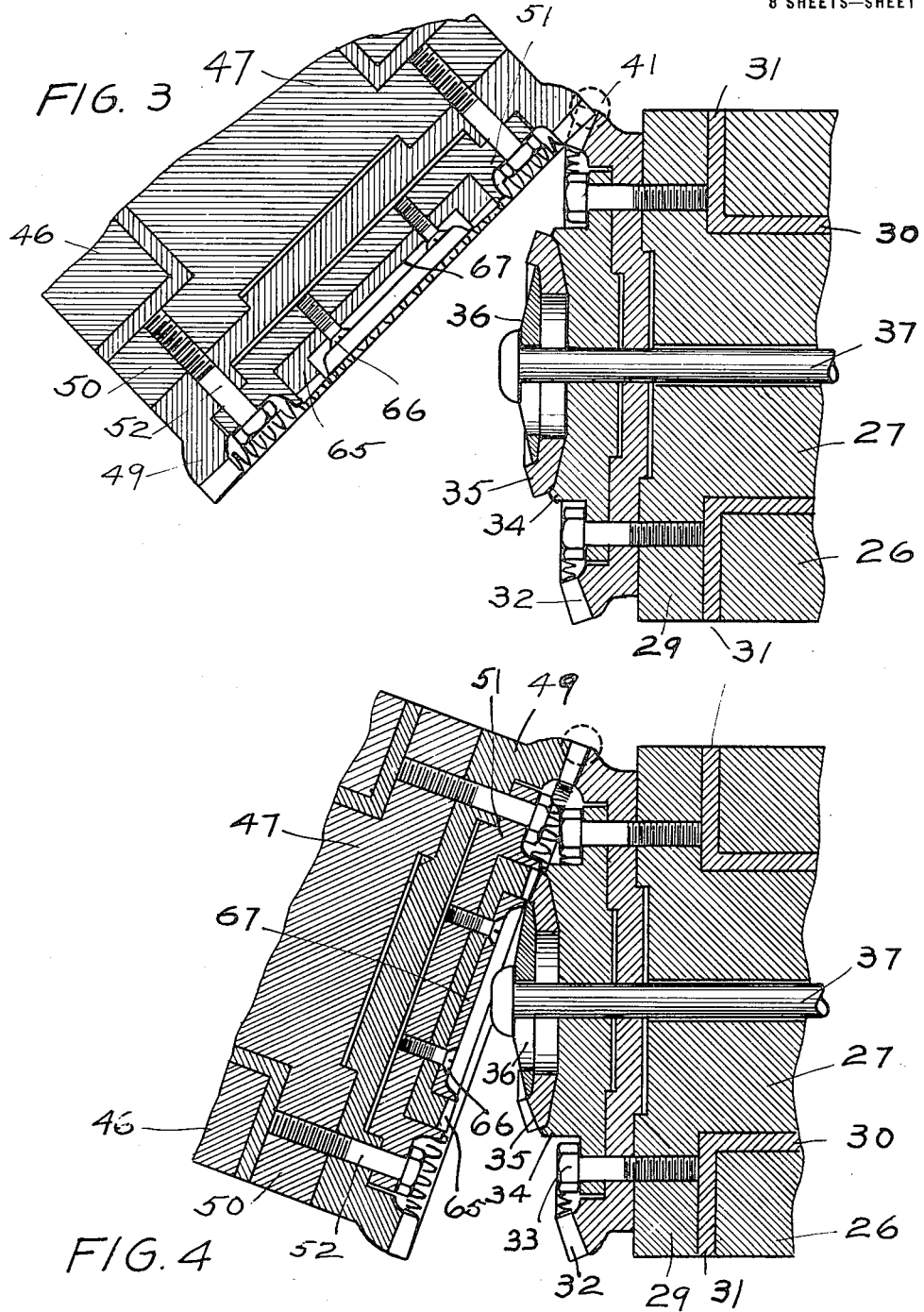

1,240,917.

Patented Sept. 25, 1917.
8 SHEETS—SHEET 5.

Inventor
Harold N. Anderson,
By Kerr, Page, Cooper & Hayward,
Attorneys

H. N. ANDERSON.
GEAR ROLLING MACHINE.
APPLICATION FILED OCT. 15, 1915. RENEWED AUG. 17, 1917.

1,240,917.

Patented Sept. 25, 1917.
8 SHEETS—SHEET 6.

Inventor
Harold N. Anderson,
By Kerr, Page, Cooper & Hayward,
Attorneys.

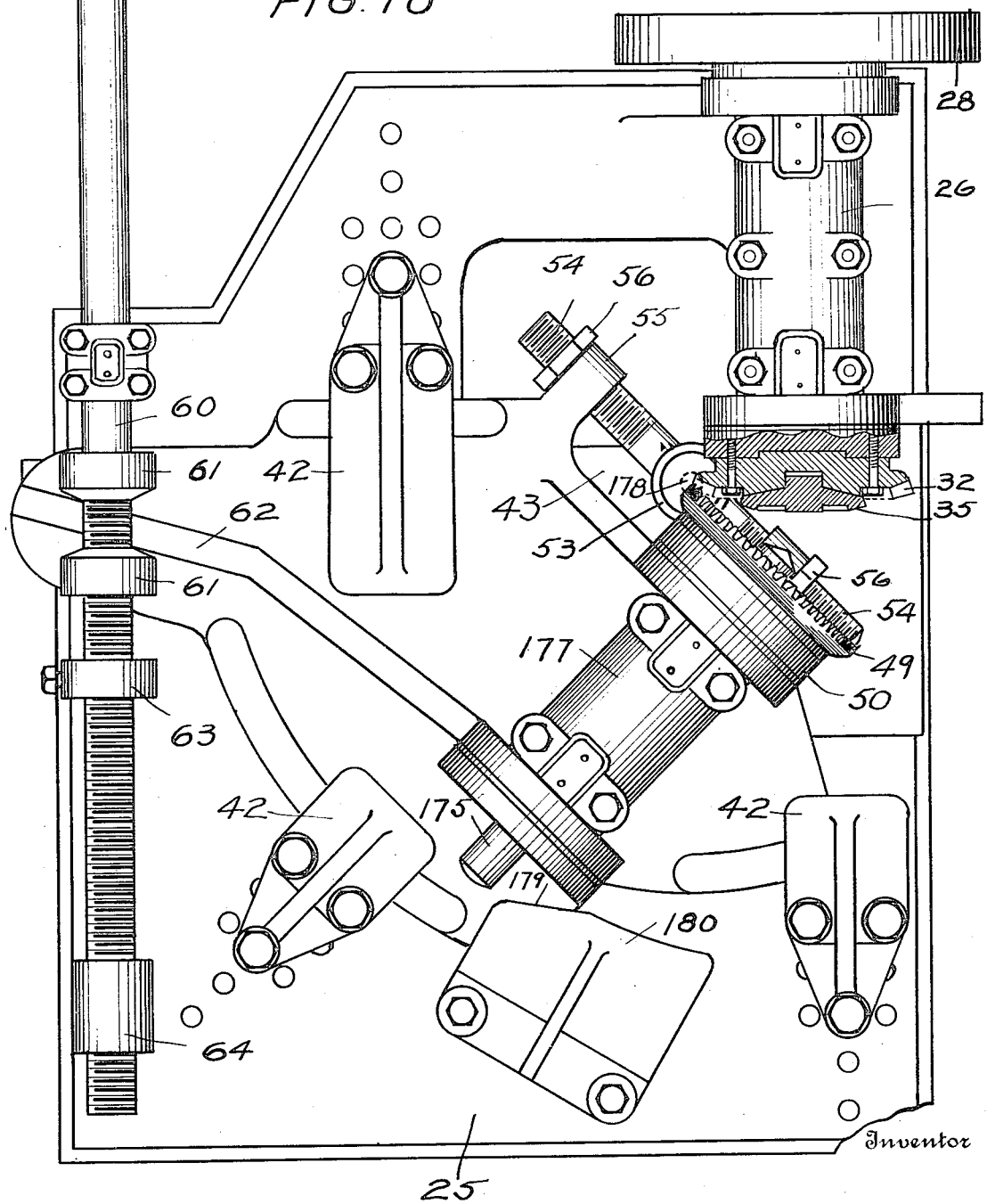

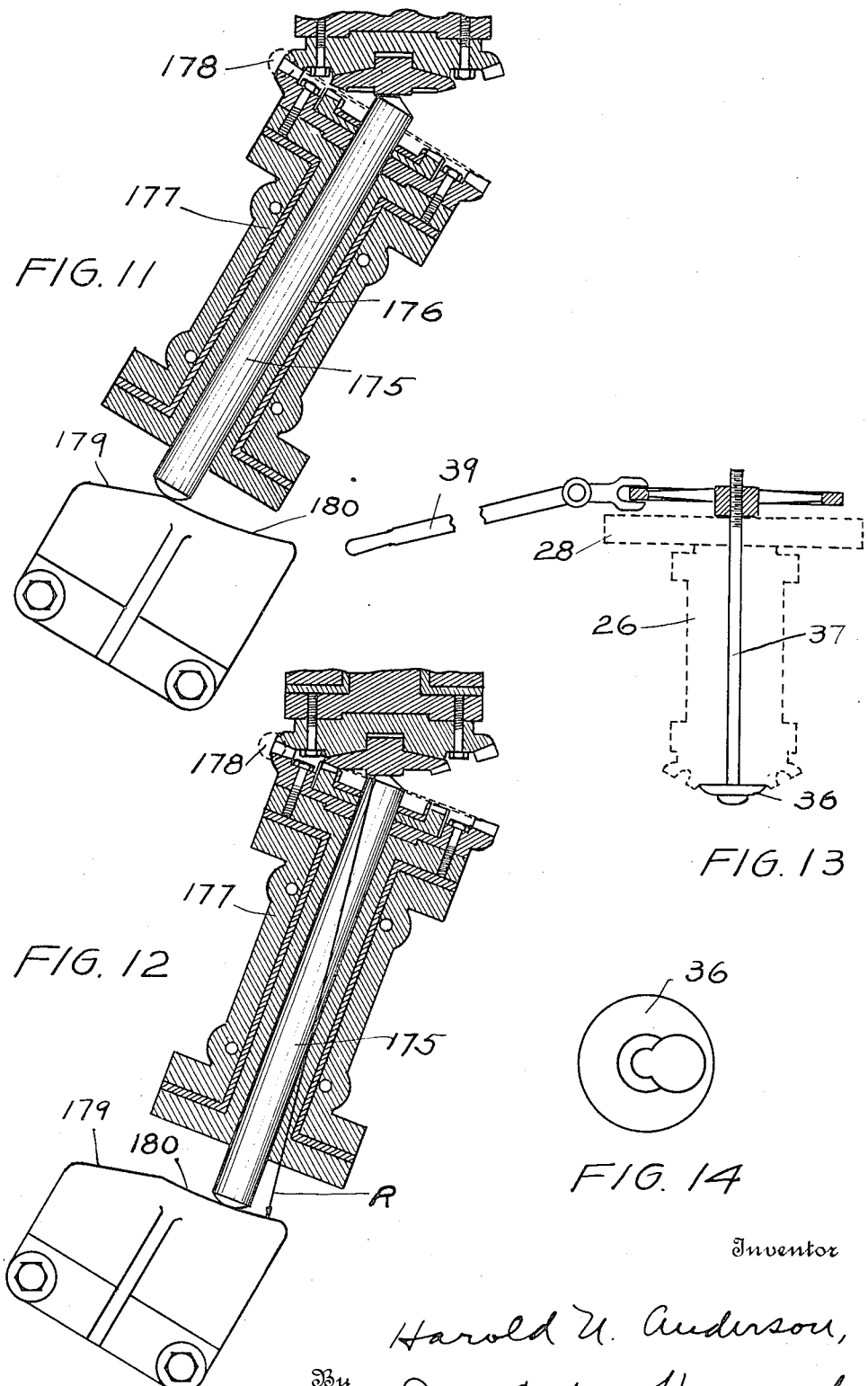

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR-ROLLING MACHINE.

1,240,917.     Specification of Letters Patent.     Patented Sept. 25, 1917.

Original application filed November 11, 1913, Serial No. 800,251. Divided and this application filed October 15, 1915, Serial No. 55,976. Renewed August 17, 1917. Serial No. 186,820.

*To all whom it may concern:*

Be it known that I, HAROLD N. ANDERSON, a citizen of the United States, residing at Cleveland, in the county of Cuyahoga and State of Ohio, have invented certain new and useful Improvements in Gear-Rolling Machines, of which the following is a full, clear, and exact description.

This application is a division from my earlier application, S. N. 800251, filed November 11th, 1913, and my invention relates to machines for forming teeth on gears by rolling a blank gear against a die-roll having a working face complementary in essential particulars to the form it is desired to impart to the blank. The die-roll may be a counterpart of the gear the blank is designed to mesh with, or it may be a roll which, though not like the gear the finished blank will be mated with, is capable of forming teeth of the desired form and size on the blank. The embodiment of my invention herein shown is only adapted to roll teeth on bevel gears, but it is not therefore to be inferred or understood that the invention is limited to that use.

The principal advantages derived from rolling teeth on gears are:

First; the metal in the teeth, and in the part of the gear adjacent to the teeth, is thereby rendered very dense and fine grained.

Second; the grain, or fiber, of the metal is made to follow the contour of the teeth to a considerable extent, giving them very great strength.

Third; a high degree of accuracy, both as to size and form of teeth, is assured.

Fourth; gears can be produced by this method at a much smaller cost than by any other. This is particularly true of bevel gears, the production of which has in the past been very expensive.

Fifth; gears may be made of materials which cannot be made into gears by any other process.

Sixth; gears made of materials which are hardened by sudden chilling; such, for example, as high carbon steel, may be hardened to a considerable extent while they are being rolled. The die-roll may be kept at a chilling temperature by a jet of cold air or water for this purpose.

While the valuable qualities of rolled gears are primarily due to the fact that they are rolled, these qualities, or at least part of them, are only attainable by maintaining synchronous relations between the teeth on the die-roll and the developing teeth on the blank while the latter are being formed. This synchronism may be maintained by driving the blank at such velocity that the imaginary line which, when the gear is finished, will be known as its pitch-line, will move from the beginning to the end of the tooth-forming operation at the same velocity as the pitch-line of the die-roll. The structure herein shown is provided with means for this purpose.

In the accompanying drawings: Figure 1 is a plan view of my machine with a blank in place to be rolled.

Fig. 2 is a similar view, but with the parts in the positions they occupy at the completion of the blank.

Fig. 3 is an enlarged, sectional, view of parts of Fig. 1.

Fig. 4 is an enlarged sectional, view of parts of Fig. 2.

Fig. 10 is a view similar to Fig. 1 except that the machine shown is equipped with an automatic blank-clamping device, in place of the blank-clamping device shown in Figs. 1 and 2.

Figs. 11 and 12 are details of the automatic blank-clamping device.

Figs. 13 and 14 are details of the blank clamping mechanism shown in Figs. 1 and 2.

Similar numerals refer to similar parts in all the views.

Figure 5:
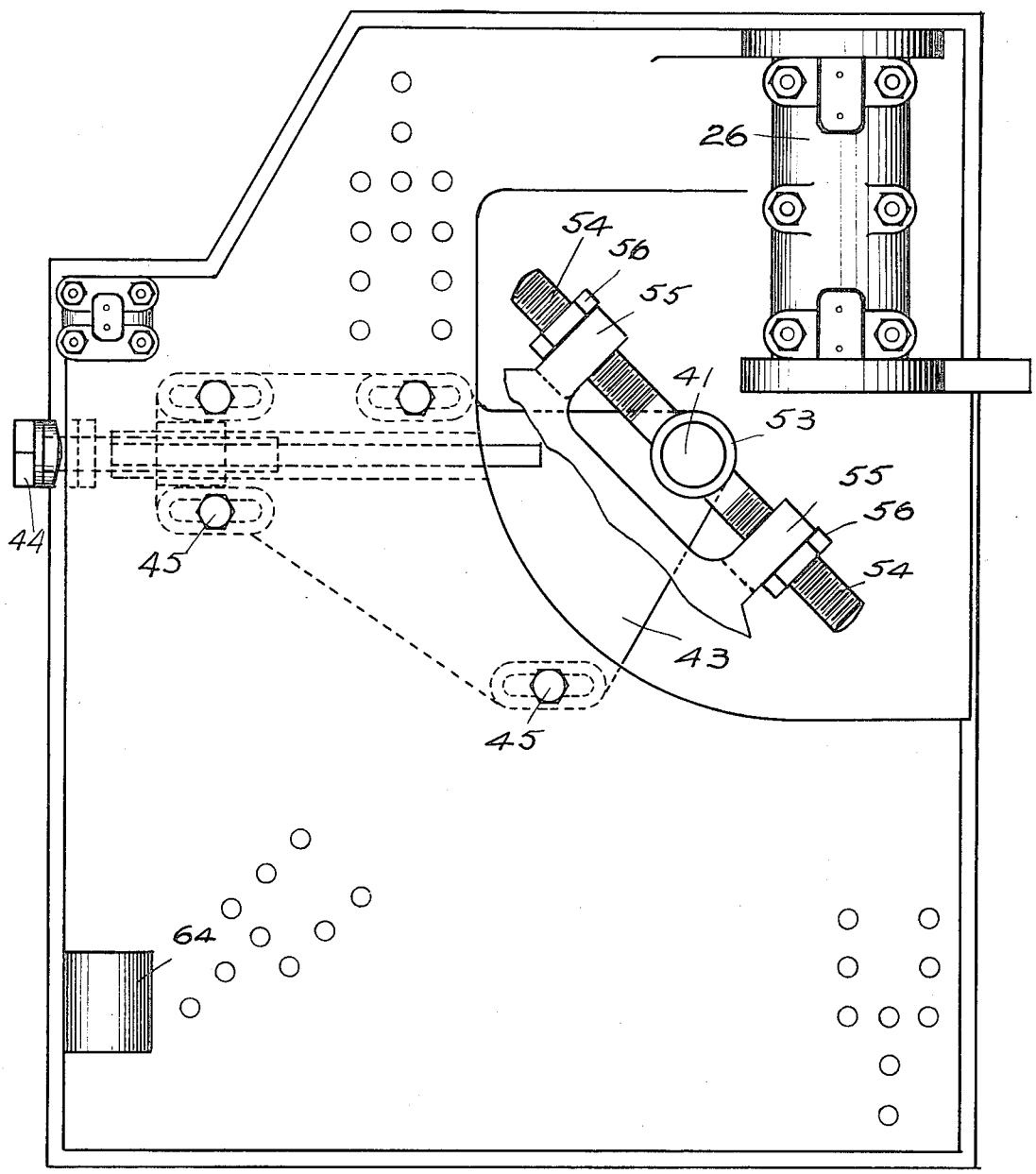
Fig. 5 is a plan of the base of Figs. 1 and 2, showing certain details of construction.

Referring now to Figs. 1 to 5, 25 is a base plate carrying a long bearing 26, through which a shaft 27 passes. A pulley 28 is secured to the shaft by any suitable means, and a flange 29 is formed at the other end of the shaft. The bearing 26 is provided with a suitable bushing 30, having flanges 31 at each end. The shaft is kept free from end play by the pulley at one end and the flange 29 at the other end, each abutting the contiguous flange 31, which is in turn backed up by the ends of the bearing. A timing gear 32 is secured to the end of the shaft by screws 33, which, passing through the plate 34 and through the gear, screw into the flange 29. The blank 35 is clamped between the plate 34 and a plate 36 by a bolt 37, which, passing longitudinally through the shaft has a wheel 38 screwed on its threaded end. The plate 36 has a central hole the size of the bolt, and a hole large enough to admit the bolt head at one side of, but overlapping, the central hole (see Fig. 14), leaving a passageway through which the bolt may pass from one hole to the other. After the blank is in place the plate 36 is slipped over the head of the bolt and dropped into place,—the bolt then being in the central hole,—after which the bolt is drawn toward the pulley end of the shaft by the bifurcated lever 39 which is pivoted to the base of the machine. The machine is then started, rotary motion being imparted to the pulley by a belt,—or the machine may be driven by any suitable means. Pressure maintained on the lever 39 causes friction between the head of the bolt and the plate 36, which, with friction between the bolt and the shaft through which it passes, rotates the bolt. The wheel 38 being meanwhile held stationary, or at least retarded, screws on to the bolt and clamps the blank. It will be observed that the plates 34 and 36 are made complementary to the contour of the blank, and that all parts of the blank are thereby supported.

A superimposed plate 40 is pivoted at 41 and held down to the plate 25 by guide blocks 42—42—42. The pivot 41 is rigidly fixed in a plate 43 arranged to be moved for adjustment in a line perpendicular to the shaft 27. The plate may be moved to any desired position by the screw 44 and clamped by screws 45. The plate 40 carries a bearing 46 in which a shaft 47 is journaled. This shaft is similar in construction to shaft 27 and kept from longitudinal movement by similar means, except that a collar 48 takes the place of the pulley. A timing gear 49 is secured to the flange 50, being clamped between it and a plate 51 by screws 52. A sleeve 53 is mounted upon the pivot 41, and has two screw studs 54 projecting from opposite sides, which pass through lugs 55 on the plate 40. The longitudinal axes of these studs coincide and pass through the axis of the pivot 41. By means of nuts 56 the position of the plate 40 with reference to the pivot 41 may be adjusted.

The following brief explanation of bevel gears will make what follows more easily understood: The teeth of bevel gears are constructed on imaginary pitch cones in the same way that the teeth of spur gears are constructed on imaginary pitch cylinders. The pitch cones of a pair of bevel gears, if mounted on shafts in place of the bevel gears, would drive each other by frictional contact in the same velocity ratio as given by the bevel gears themselves. The angle formed by the axis and one side of the pitch cone is called the pitch cone angle, and the sum of the two pitch cone angles equals the center angle. The center angle equals the angle formed by the axis of the cones, measured on the side on which the contact between the cones takes place. The pitch diameter is the diameter of the base of the cone, and since the pitch of a bevel gear is measured on a circle of the same diameter, "pitch circle" will be understood to mean a circle of the same diameter as the base of the cone. The pitch cone radius is the distance from the apex of the cone to the perimeter of its base. Treating the pitch circle as the perimeter of a plane, this imaginary plane will hereinafter be called the pitch plane of the gear.

The most common form of bevel gear is one in which the pitch cone angle is less than 90 degrees. The timing gear 32 is of this type, while the timing gear 49 is of a rarer type, the pitch cone angle being 90 degrees. This type of gear is called a crown gear, and although the term "pitch cone angle" is used and will be hereinafter used in referring to the angle formed by the axis and the pitch cone, the pitch cone of a crown gear is in fact a plane and coincides with what has already been referred to as the pitch plane. The pitch diameter and the outside diameter of a crown gear are the same, while in any other kind of bevel gear the outside diameter is larger than the pitch diameter. Moreover, the pitch of the teeth is the same at the addendum as on the pitch line.

The gear 32 is so proportioned that its pitch plane is in line with the axis of the pivot 41, and when properly adjusted the axis of the pivot will just touch the pitch circle of the gear. It will therefore be tangent to the pitch circle. The gear 49 is so proportioned that its pitch plane is in alinement with the axes of the studs 54,— and therefore with the axis of pivot 41— and when properly adjusted the axis of the pivot will be tangent to the pitch circle of this gear also. Since the pitch plane of each gear is in alinement with the pivotal axis, and each of the pitch circles is in contact with the pivotal axis, it is obvious that the plate 40 may swing on the pivot 41, within reasonable limits, without varying the depth of enmeshment of the large ends of the teeth of the gears. See Figs. 3 and 4. For the purpose of swinging the plate, a screw 60, having collars 61 which embrace a rib 62 on the plate 40, is provided. An adjustable collar 63 coming in contact with the stationary lug 64 acts as a stop to limit the movement of the plate. A die roll 65 is clamped to the plate 51 by screws 66 and a plate 67. (Figs. 3 and 4.) The working face of the die roll is in the form of a crown gear, and it is so located with reference to the gear 49 that their pitch planes coincide. After a blank, preferably hot, is clamped between the plates 34 and 36, and the machine is started the plate 40 is swung on its pivot and the die roll brought into contact with and pressed against the blank, the rotation of the parts and advance of the die roll being continued until the working face of the blank has become the complement of the working face of the die roll. That is, it will be complementary to the die-roll in that its teeth will be of such shape that they will run in mesh with the die roll at the same velocity ratio as was maintained while the teeth were being formed.

If the timing gears have teeth of the proper size and shape, and if they are enmeshed to the proper depth, swinging one of them on the pivot whose axis passes through the point where the pitch circles touch, said axis being also tangenet to both circles, will not effect the depth of enmeshment of their teeth, and hence there will be no change in the amount of back lash between the gears. As the die roll is attached to one of the timing gears, and the blank to the other timing gear, each being substantially integral with its respective gear during the time the rolling operation is in progress, it follows that an imaginary circle, which when the gear is finished will be its pitch circle, and which will just touch the pitch circle of the die roll when its teeth shall have been sunk to the proper depth in the blank, will have traveled at the same lineal velocity as the pitch circle of the die roll all of the time the rolling operation was in progress. In fact, the velocity of the pitch circles will be equal even before the blank and die roll come into contact with each other. In other words there can be no rotary advance of either with reference to the other.

The action of the die roll teeth on the blank, due to the maintenance of equa lineal velocity of the pitch circles will now be explained:

Once during each revolution of the die roll each of its teeth attains a position where it is bisected by an imaginary straight line drawn from the axis of the die roll to the axis of the blank. That is, once during each revolution each tooth of the die roll points directly at the axis of the blank. If by any means a mark—a mere point—could be made on the blank, coinciding with a mark at the center of the point of each tooth in the die roll at the moment when each mark coincides with said bisecting line, this being continued until the rolling of the teeth is completed, it would be found that a line drawn through each group of points on the blank would be straight, and in a plane radial to its axis. From this it is clear that the teeth of the die roll enter the blank on a line coincident with a radial plane. In other words, the progressive deepening of each space in the blank is along a straight line leading to the axis of the blank. This gives great strength to the teeth for the same reason that rolled metal has greater strength longitudinally than transversely. What is commonly referred to as the "grain" of rolled metal runs parallel to the direction in which it moved in passing through the rolls, and the metal has much greater tensile strength parallel to than across the grain. The action of the die is analogous to that of the rolls, and if the grain were indicated by lines the lines would run approximately parallel to the tooth surfaces, thus forming a symmetrical figure resembling a pyramid. The normal strain on the teeth puts one side in tension and the other side in compression, and it is seen from the foregoing that these strains are longitudinal with reference to the grain of the metal.

While the foregoing paragraph describes the action of either an ordinary bevel die-roll or of a crown die-roll the latter has properties peculiar to itself. A crown gear is, in fact, a circular rack. That is, the pitch diameter and outside diameter being the same, the outside velocity and pitch line velocity are equal, which is a condition peculiar to a rack. In rolling bevel gears this is of considerable importance, which will presently be manifest. In my copending application, Serial Number 643.010, I have shown and claimed a gear rolling machine in which the die is a rectilineal rack. There are certain valuable qualities common to rectilineal and circular racks. In all operations involving displacement of metal it is well known that sufficient time should be allowed to permit the metal to "flow" to its new position. Since entrance of the teeth of a die-roll having the form of a rack is due wholly to the arcual movement of the perimeter of the blank, while with any other form of die roll it is due to the arcual movements of the die-roll and blank combined, it is clear that in the former case the entrance of the teeth into the blank is slower than in the latter case. As the teeth of the rack enter slower, they naturally leave slower, the result being that they remain in contact with the teeth of the blank a longer time, from which it necessarily follows that more teeth are in action simultaneously where the die roll has the form of a rack, than with any other form of roll. The truth of this conclusion is manifest in the drawings. For example, compare Fig. 2 with Fig. 6: In the former there are several times as many teeth in action as in the latter. Another thing which is very evident is the relatively direct path by which the teeth of the die roll in Fig. 2 enter the blank. That is, the paths of entrance and exit are far less divergent in the case of the structure shown in Fig. 2 than in that shown in Fig. 6. This being true, it is clear that the lateral strain on the teeth of the blank—and the teeth of the die roll too—is much less where the die roll is a crown gear, than when it is a bevel gear. Furthermore, since the teeth of the crown gear enter and leave the blank slower than those of a regular bevel gear, it follows that the speed of rotation can be higher with the crown die roll than with an ordinary bevel die roll. The pitch cone radius of the blank and die roll must be equal, no matter what form the latter may have. Bearing this in mind it is evident that were the die rolls 65, Fig. 3, and 141, Fig. 6, each adapted to roll the same blank, the pitch circle of the latter would be much smaller than that of the former. Since the pitch of the teeth on each would be the same the former would have more teeth than the latter. It will be seen, therefore, that the crown die roll has the further advantage of having more teeth than a die roll of any other form could have, which increases its durability and, because of its greater radiating surface, lessens its liability to injury from heating. As a die roll having the form of roll 65 may make the same blank as one having the form of roll 141, it is evident that a die roll having a number of teeth anywhere between the two may also be used to roll said blank, and from the foregoing it is clear that such a roll would possess the advantages of a crown die roll to a degree proportional to its nearness to the form of a crown roll. The crown die roll and timing gear may be used to roll both gears and pinions and it is only necessary to provide special timing gears for the blank shaft.

Figure 6:
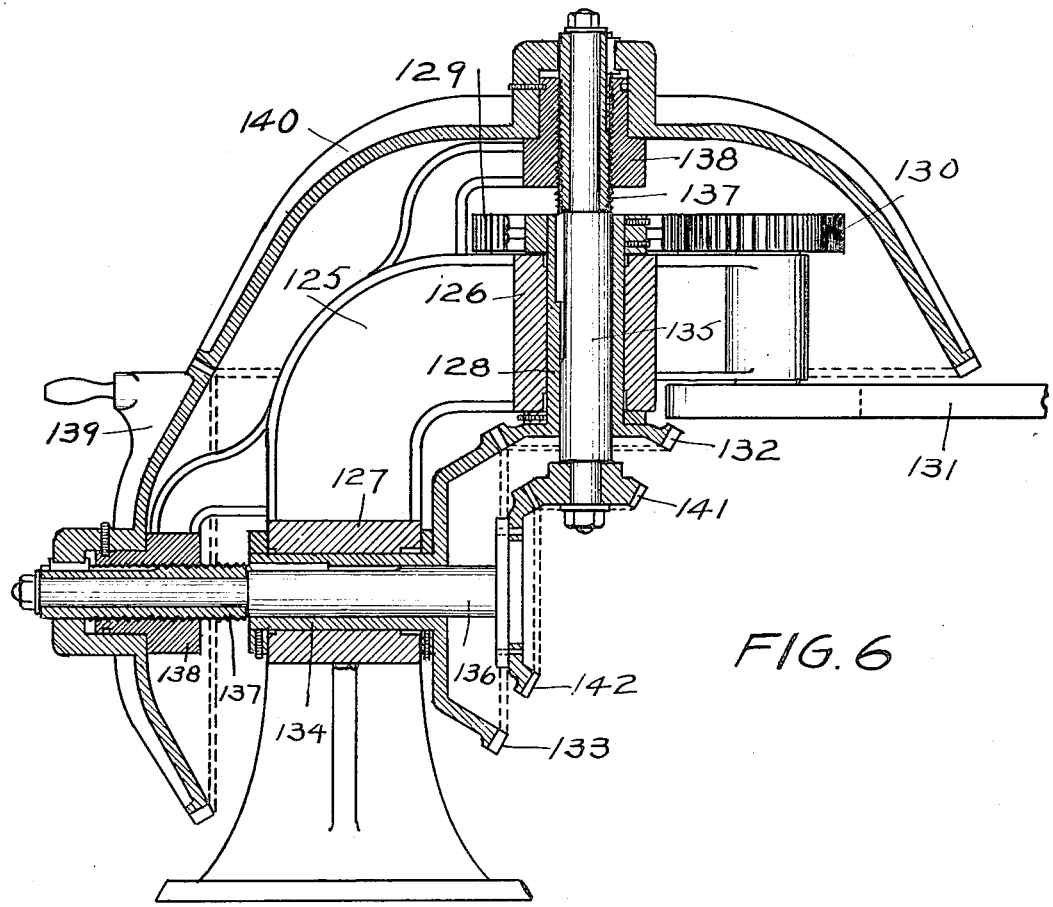
Fig. 6 is a sectional elevation of a modified form of my invention.

Fig. 6 illustrates a structure in which movement of approach between the die roll and blank is attained by moving each longitudinally with reference to its timing gear. In this structure 125 is a frame carrying bearings 126 and 127. A sleeve 128 is arranged to rotate in bearing 126, and is provided with a rigidly attached gear 129 which meshes with a driving gear 130, the latter in turn being driven by a belt 131. The lower end of the sleeve terminates in a timing gear 132, which meshes with a timing gear 133 carried by a sleeve 134 journaled in bearing 127. Each of the sleeves has within it a shaft,—135 and 136 respectively,—capable of longitudinal movement, but which, by means of splines, is made to rotate in unison with the sleeves. The outer end of each shaft is reduced in diameter and passes through a sleeve 137, a nut and washer at the end of each shaft preventing longitudinal movement of the shaft with reference to the sleeve. That is, each sleeve is confined between the washer and the shoulder formed by reducing the diameter of the shaft. The sleeves are threaded and screw into threaded hubs 138 carried by the frame 125. Outside of the hubs each sleeve 137 is connected by a spline to a bevel gear,—139 and 140 respectively,—said gears being mounted to rotate on portions of the hubs extending beyond the frame. A set screw entering a groove in the hub which carries it keeps each bevel gear in place. Rotation of the gear 139 rotates the sleeve 137, which, being screwed into the hub 138, causes longitudinal movement of it and of the shaft 136. At the same time, through the medium of gear 140 and the upper threaded sleeve 137, shaft 135 will be moved longitudinally. Obviously, if the pitch of the threads on the sleeves 137 is the same the relative distance the shafts move will be inversely proportional to the velocity ratio of gears 139 and 140. One of the shafts carries a die roll 141, and the other a blank 142, and it is evident that the depth of enmeshment of gears 132 and 133 does not vary as the blank and die roll approach or recede from each other. Therefore, the pitch line velocity is maintained equal while the teeth are being formed on the blank.

Figure 7:
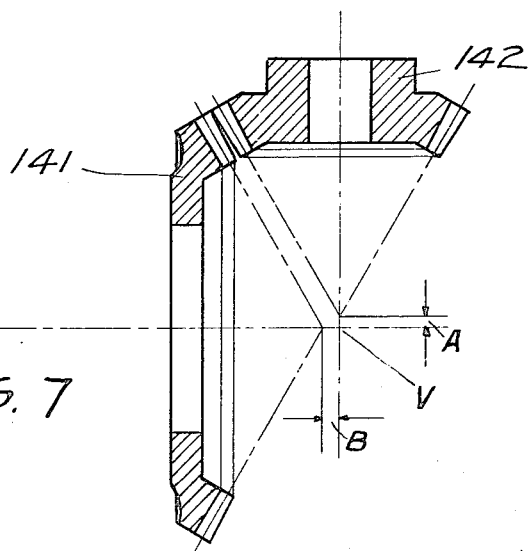
Fig. 7 is a diagram for the purpose of demonstrating certain movements in Fig. 6.
Figure 8:
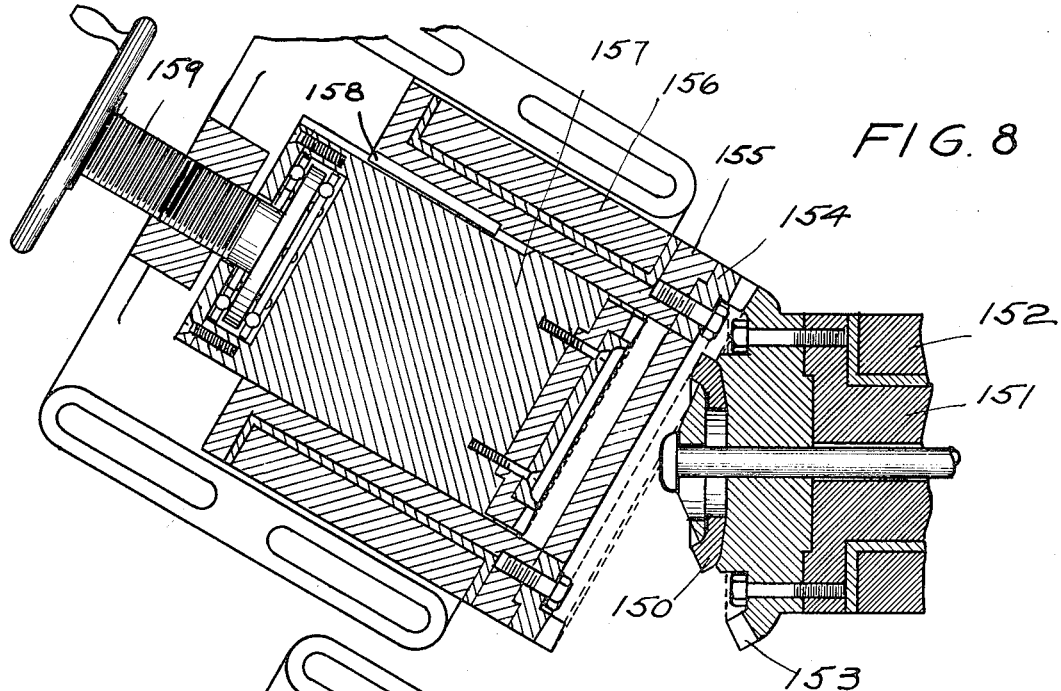
Fig. 8 is a sectional plan of another modification of my invention, with a blank in place ready for rolling.
Figure 9:
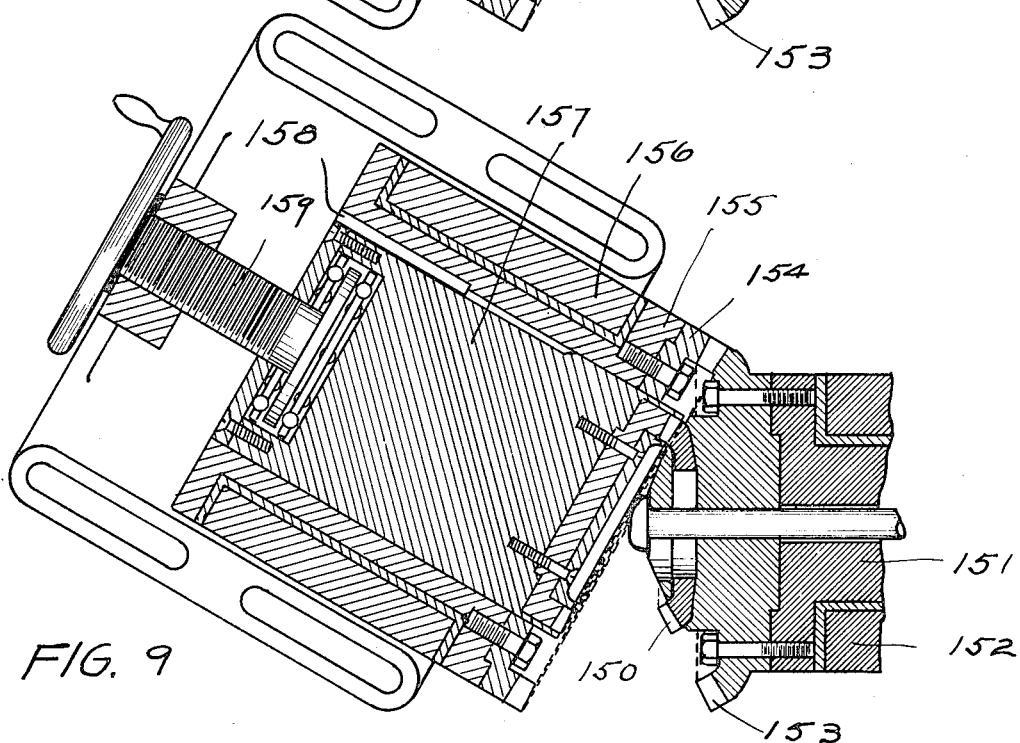
Fig. 9 is a similar view but with the parts in the positions they occupy at the completion of the blank.

Figs. 8 and 9 illustrate another modification. In this the blank 150 is carried by a blank holder similar to the one shown in Figs. 1 to 4, the shaft 151 being journaled in bearing 152 and rotated by means not shown. A timing gear 153 is mounted to rotate on the shaft in the manner already described. The companion timing gear, 154, is mounted upon a longitudinally immovable, but rotatable, sleeve 155, journaled in a stationary bearing 156. A shaft 157 slides longitudinally in, but is made to rotate in unison with, the sleeve by a spline 158. Longitudinal movement is imparted to the shaft by a screw 159, and a die roll is secured to the end of the shaft opposite the screw. The die roll and the timing gear 154 are crown gears. It will be observed that in this machine the movement of approach is by the die roll only, which would be impracticable in the form shown in Fig. 6, for reasons now to be explained:

In the structure shown in Figs. 1 to 4 the distance from the pivot on which the die roll swings to its vertex; i. e., its center, equals the distance from the pivot to the vertex of the blank, and this equality is constant. It is clear, therefore, that there is no radial displacement between the die roll and blank. In other words, there is no relative movement between the die roll and blank along the lines of their pitch radii. In Fig. 6, radial movement of either the blank or die roll, one with reference to the other, is prevented by the gears 139 and 140. Fig. 7 is a diagram showing the longitudinal movement required of the die roll and the blank in Fig. 6 in order that their vertexes may arrive at the point V simultaneously. Assuming that the pitch of the threads on sleeves 137 is the same, it is clear that if the diameter of gear 139 is to the diameter of gear 140, as distance A is to distance B, there will be no radial movement between the die roll and blank during the tooth forming operation. Since in a crown gear (Figs. 8 and 9) the pitch cone is a plane coincident with the pitch plane, and perpendicular to the axis of the gear, it follows that longitudinal movement of the gear is along a line perpendicular to its pitch radius, and hence perpendicular to the pitch radius of the blank. For this reason there is no radial displacement of the die roll or blank, though their approach is effected by longitudinal movement of the die roll only.

In the automatic clamping device shown in Figs. 10, 11 and 12 the only essential difference is that the blank is held in the die holder by a plunger 175 which passes through the shaft 176, and, as the bearing 177 swings on axis 178, is pressed against the hub of the blank by a stationary cam 179. In Fig. 11 the plunger has just passed the cam and has arrived at a radial guard 180 which holds the plunger against the blank as the bearing 177 continues to swing on its pivot 178. Contact of the plunger with the rotating blank and with the shaft 176 causes the plunger to rotate, and since the blank holder and the die roll are geared together by the timing gears a comparatively moderate pressure is sufficient to prevent the blank turning in the holder. If desired the guard 180 may be radial to a center a little to one side of the center of the blank so there will be a slight advance of the plunger while the rolling of the blank progresses.

This will be understood by reference to Fig. 12 where a line R, representing the radius of guard 180 starts at a point to the left of the axis of the blank. The guard 180 in Fig. 10 may be assumed to be so constructed.

It will be obvious to any skilled mechanic that the die roll and blank may, by very simple modifications in the means for connecting them to their respective timing gears, be transposed. For example, in Figs. 8 and 9 the die roll might be carried by the shaft 151 and the blank by shaft 157, the latter becoming when finished a crown gear. The same thing applies to the structure shown in Figs. 1 to 5. Furthermore, two gears adapted to run together might be mounted in place of the blank and die roll respectively, and run together for the purpose of smoothing up or polishing their teeth. Gears which have warped slightly in hardening might by this means be restored. If necessary an abrasive may be applied to the teeth while the gears are being run together.

In carrying out the broad principles of my invention it is not essential that the timing gears be larger in diameter than the die roll and blank.

What I claim is as follows:—

1. In a machine for rolling gears, the combination of a pair of timing gears mounted to rotate with their teeth enmeshed, one of them being a crown gear, a die roll having a working face similar to that of a crown gear, mounted to rotate upon the same axis and in unison with said crown gear, means for mounting a blank so it rotates upon the same axis and in unison with the other timing gear, and means for producing movement of approach between the die roll and blank; said means enabling the movement of approach to continue after the die roll and blank have come into contact and until the die roll has formed teeth on the blank.

2. In a machine for rolling gears, the combination of a pair of timing gears mounted to rotate with their teeth enmeshed, one of them being a crown gear, a die roll having a working face similar to that of the crown gear, mounted to rotate upon the same axis and in unison with said crown gear, means for mounting a blank so it rotates upon the same axis and in unison with the other timing gear, and means for producing movement of approach between the die roll and the blank, said means enabling the movement of approach to continue after the die roll and blank come into contact and until the die roll has formed teeth on the blank, and means for keeping the depth of enmeshment of the timing gears' teeth uniform during said movement of approach.

3. In a machine for rolling gears, the combination of a toothed die roll whose pitch diameter and outside diameter are equal, means for mounting a blank with a portion of its working face contiguous to one or more teeth on the die roll, means for imparting relative motion to the die roll and blank, whereby portions of the working face of the blank are brought successively into similar contiguity with successive teeth on the die roll, and means for contemporaneously producing relative movement of approach between the die roll and blank to cause the teeth on the die roll to sink into the blank and form teeth thereon.

4. In a machine for rolling gears, the combination of a toothed die roll whose pitch diameter and outside diameter are equal, means for mounting a blank with a portion of its working face contiguous to one or more teeth on the die roll, means for imparting relative motion to the die roll and blank, whereby portions of the working face of the blank are brought successively into similar contiguity with successive teeth on the die roll, means for pressing the die-roll and blank together and means for maintaining synchronous relations between the teeth on the die roll and those it is forming on the blank.

5. In a machine for rolling gears, the combination of a rotatably mounted toothed die roll whose pitch diameter and outside diameter are equal, means for rotatably mounting a blank with its working face contiguous to the die roll, means for rotating the blank and die roll at equal pitch line velocity, and means for contemporaneously producing relative movement of approach between the die roll and blank, said means enabling the continuation of said movement of approach after the die roll and blank have engaged, until teeth have been formed on the blank.

6. In a machine for rolling gears, the combination of a pair of gears rotatably mounted with their teeth enmeshed, a die roll whose pitch diameter and outside diameter are equal, mounted to rotate upon the same axis as and in unison with one of said gears, a blank holder mounted to rotate upon the same axis as and in unison with the other gear, and means for producing relative movement of approach between a die roll and a blank carried by the holder, whereby they may be brought into engagement and teeth formed on the blank.

7. In a machine for rolling gears, the combination of a pair of gears rotatably mounted with their teeth enmeshed, a die roll, whose pitch diameter and outside diameter are equal, mounted to rotate upon the same axis as, and in unison with, one of said gears, a blank holder mounted to rotate upon the same axis as, and in unison with, the other gear, means for producing relative movement of approach between a die roll and a blank carried by the holder, whereby they may be brought into engagement and teeth formed on the blank, and means for keeping the gears enmeshed to a uniform depth while said movement of approach and the tooth-forming operation progresses.

8. In a machine for rolling gears, the combination of a toothed die roll whose pitch diameter and outside diameter are equal, means for mounting a blank with a portion of its working face contiguous to one or more teeth on the die roll, means for bringing other portions of the working face of the blank successively into similar contiguity with successive teeth on the die roll, and means for contemporaneously producing relative movement of approach between the die roll and blank to cause the teeth on the die roll to sink into the blank and form teeth thereon.

9. In a machine for rolling gears, the combination of a die roll having the characteristics of a crown gear, means for mounting a blank with a portion of its working face contiguous to one or more teeth on the die roll, means for bringing other portions of the working face of the blank successively into similar contiguity with successive teeth on the die roll, and means for contemporaneously producing relative movement of approach between the die roll and blank to cause the teeth on the die roll to sink into the blank and form teeth thereon.

10. In a machine for rolling gears, the combination of a die roll having the characteristics of a crown gear, means for mounting a blank with a portion of its working face contiguous to one or more teeth on the die roll, means for bringing other portions of the working face of the blank successively into similar contiguity with successive teeth on the die roll, means for contemporaneously producing relative movement of approach between the die roll and blank to cause the teeth of the die roll to sink into and form teeth on the blank, and means for maintaining synchronous relations between the teeth on the die roll and the developing teeth on the blank.

11. In a machine for rolling gears, the combination of a die roll having the characteristics of a crown gear, means for mounting a blank with a portion of its working face contiguous to one or more teeth on the die roll, means for bringing other portions of the working face of the blank successively into similar contiguity with successive teeth on the die roll, means for contemporaneously producing relative movement of approach between the die roll and blank to cause the teeth of the die roll to sink into and form teeth on the blank, and a toothed gear connection between the die roll and blank, whereby synchronous relations are maintained between the teeth on the die roll and the developing teeth on the blank.

12. In a machine for rolling gears, the combination of a die roll whose working face is perpendicular to its axis, means for mounting a blank with a portion of its working face contiguous to the working face of the blank, means independent of contact between the blank and die-roll for bringing other portions of the blank successively into similar contiguity with successive portions of the die roll, and means for contemporaneously producing movement of approach between the die roll and blank, whereby to form teeth on the blank.

13. In a machine for rolling bevel gears, the combination of a rotatably mounted die roll, means for rotatably mounting a blank with its working face contiguous to the working face of the die roll, means for rotating them and means for producing relative movement of approach between die roll and blank whereby the teeth of the die roll may be caused to sink into and form teeth on the blank, the form of the die roll being such that its teeth enter and leave the blank slower than will the teeth of a bevel gear adapted to mate with the blank when finished.

14. In a gear rolling machine, the combination of a crown gear, means for mounting a gear blank with its working face contiguous to one or more teeth of the gear, means for bringing other portions of the working face of the blank successively into similar contiguity with successive teeth on the gear, means for contemporaneously producing relative movement of approach between the gear and blank to cause the teeth of the gear to sink into and form teeth on the blank, and means for maintaining synchronous relations between the teeth on the gear and the developing teeth on the blank.

15. In a gear rolling machine, the combination of a crown gear, means for mounting a gear blank with its working face contiguous to one or more teeth of the gear, means for bringing other portions of the blank successively into similar contiguity with successive teeth on the gear, means for contemporaneously producing relative movement of approach between the gear and blank to cause the teeth of the gear to sink into and form teeth on the blank, and a geared connection between said gear and blank whereby synchronous relations are maintained between the teeth on the gear and the developing teeth on the blank.

16. In a machine for rolling gears, the combination of a pair of timing gears rotatably mounted with their axes forming an angle, a crown gear mounted so it and one of the timing gears rotate in unison and upon the same axis, means for mounting a blank so it and the other timing gear rotate in unison and upon the same axis, and means for moving the crown gear toward the blank contemporaneously with rotary movement of the crown gear and blank.

17. In a gear rolling machine having a die roll, a blank holder and means for producing relative movement of approach between them for the purpose of forming teeth on the blank, the combination of a cam operated device for clamping the blank in the holder, a cam for operating same, and means whereby the movement of approach between the die roll and blank produces relative movement between the cam and the clamping device and causes the latter to clamp the blank in the holder.

18. In a gear rolling machine, a blank holder and a die arranged for relative movement of approach whereby to force the die teeth into a blank contained in the holder, and a clamping device operated by said movement, whereby the blank is kept clamped in the holder while the movement continues.

19. In a gear rolling machine, a blank holder and a die arranged for relative movement of approach whereby to force the die teeth into a blank contained in the holder, and a clamping device operated by said movement, said device being arranged to effectively clamp the blank in the holder during the initial part of said movement and maintain an effective clamping of the blank during the remainder of the movement.

20. In a gear rolling machine, a blank-holder, a die-roll, means for producing relative movement of the blank-holder and die-roll whereby to cause the die-roll to roll teeth on the blank, and automatic means for clamping a blank in the blank-holder, said means being arranged to operate during the initial part of the aforesaid relative movement.

21. In a gear rolling machine, a blank-holder, a die-roll, means for producing relative movement of approach between the die-roll and blank-holder whereby the die-roll is brought into contact with a blank in the blank-holder, and automatic means for clamping a blank in the holder, said means being arranged to operate during the initial part of said movement of approach.

22. In a gear rolling machine, a blank-holder, a die-roll, means for producing relative movement of approach between the die-roll and blank-holder whereby the die-roll is brought into contact with a blank in the blank-holder, and automatic means for clamping the blank in the holder, said means being operated as a result and during the initial part of said movement of approach.

23. In a gear rolling machine, a blank-holder, a die-roll, means for moving the die-roll into contact with a blank in the holder, and means for employing the initial part of said movement to clamp the blank in the holder.

24. In a gear rolling machine, a blank-holder, a die-roll, a member adapted to press against and hold a blank in the holder, means for producing relative movement between the die-roll and blank whereby the die roll is made to form teeth on the blank, and a cam associated with said means whereby said member is automatically pressed against the blank while the teeth are formed.

25. In a gear rolling machine, a blank-holder, a hollow shaft, a die-roll mounted thereon, a plunger arranged to slide in said shaft, means for moving the die-roll to contact with a blank in the holder, and means for moving the plunger with reference to the shaft and causing it to press the blank into the holder.

26. In a gear rolling machine, a blank-holder, a hollow shaft, a die-roll mounted thereon, a plunger arranged to slide in said shaft, means for moving the die roll to contact with a blank in the holder, and a cam for moving the plunger with reference to the shaft and causing it to press the blank into the holder.

27. In a gear rolling machine, a blank-holder, a hollow shaft, a die-roll mounted thereon, a plunger arranged to slide in said shaft, a pivot upon which the shaft swings to bring the die-roll into contact with a blank in the holder, and a cam which moves the plunger to engage and press the blank into the holder as the die-roll approaches the blank.

28. In a gear rolling machine, a blank-holder, a hollow shaft, a die-roll mounted thereon, a plunger arranged to slide in said shaft, a pivot on which the shaft swings to bring it into contact with a blank in the holder, and a stationary cam in the path of the plunger whereby it is moved as the shaft moves on its pivot and pressed against the blank in the holder.

29. In a gear rolling machine, a blank-holder, a die-roll, means for producing relative movement of the die-roll and blank-holder whereby to cause the die-roll to form teeth on the blank, and automatic means for clamping a blank in the holder, said means being arranged to effectively clamp the blank during the initial part of said relative movement and thereafter continuously augment the clamping effect until the teeth are formed on the blank.

30. In a gear rolling machine, a blank-holder, a die-roll, means for producing relative movement of the blank-holder and die-roll whereby to cause the die-roll to form teeth on a blank in the holder, a member adapted to press and hold a blank in the holder, a cam whereby said member is made to press and hold the blank in the holder, said cam having an incline which moves the member rapidly and clamps the blank effectively during the initial part of said movement, said incline being succeeded by an incline of relatively slight degree whereby the member is moved continuously to compensate for shrinking of the blank.

31. In a gear rolling machine, a blank-holder, a hollow shaft, a die-roll mounted thereon, a plunger arranged to slide in said shaft, its end being conical and adapted to sustain rolling contact with a blank in the holder, means for moving the die-roll to contact with a blank in the holder, and a cam for moving the plunger and causing its conical end to engage and hold the blank in the holder.

32. In a gear rolling machine, means for supporting a gear blank, a die-roll whose pitch-line and addendum-line are equal, means for pressing the die-roll and blank together, and means other than contact between the blank and die-roll for producing contemporaneously with said pressure relative movement whereby the die is rolled on the face of the blank.

33. In a gear rolling machine, means for supporting a rotating gear blank, a rotatably mounted die-roll whose pitch-line and addendum line are equal, means independent of contact between them for rotating the die-roll and blank, and means for pressing the rotating die-roll and blank together.

34. In a gear rolling machine, means for supporting a rotating gear blank, a rotatably mounted die-roll whose pitch-line and addendum-line are equal, means for rotating the die-roll and blank and maintaining equal pitch-line velocity, and means for pressing the rotating die-roll and blank together.

35. In a gear rolling machine, means for supporting a rotating blank, a rotatably mounted die-roll whose pitch-line and addendum-line are equal, means for rotating the die-roll and blank, means for pressing them together whereby to force the die teeth into the blank and form teeth thereon, and means for maintaining synchronous relations between the teeth on the die-roll and the teeth it is forming on the blank.

36. In a gear rolling machine, means for supporting a blank, a rotary die-roll whose pitch-line and addendum-line are equal, and means for imparting relative motion to the die-roll and blank whereby the die-roll is rolled on and its teeth sunk into the face of the blank.

37. In a machine for rolling bevel gears, a die-roll adapted to form teeth on bevel gears, means for supporting a bevel gear blank, means for rotating the die-roll and blank, means for producing relative movement therebetween whereby to form bevel gear teeth on the blank, and shrouds between which the die-roll teeth are located while they act upon the blank.

38. In a gear rolling machine, means for supporting a blank, a toothed die-roll, and means for imparting relative motion to the die-roll and blank whereby to form teeth on the latter, the die-roll having a pitch-cone angle of such magnitude as to cause the angle formed by its axis and the axis of the blank to be greater than a right angle.

39. In a machine for rolling gears, the combination of a crown die-roll and a blank-holder, each rotatably mounted with their axes forming an angle, means for varying said angle to bring the die-roll and a blank carried by the holder into contact and for continuing said variation until teeth are formed on the blank, and means for maintaining synchronous relations between the teeth on the die-roll and those on the blank.

40. In a machine for rolling gears, a pair of timing gears rotatably mounted with their teeth enmeshed and their axes forming an angle, a crown die-roll attached to one of said gears and a blank holder attached to the other so that they are substantially integral therewith, and means for swinging one of said timing gears on an axis which is tangent to each of their pitch-circles and which passes through the point of contact of said circles, whereby to bring the die-roll and a blank carried by the holder into contact.

41. In a gear rolling machine, a blank-holder, a die-roll, means for moving the die-roll into contact with a blank in the holder, means for rotating the die-roll and blank-holder, a member adapted to have rolling engagement with the blank while it rotates with the die-roll in contact with it, and means for pressing said member against the blank thereby keeping it in place in the holder.

42. In a gear rolling machine, a blank-holder, a die-roll, means for moving the die-roll into contact with a blank in the holder, means for rotating the die-roll and blank-holder, a conical member adapted to have rolling engagement with the blank while it rotates with the die-roll in contact with it, and means for pressing said member against the blank, thereby keeping it in place in the holder.

43. In a gear rolling machine, a blank-holder, a hollow shaft, a die-roll mounted thereon, a plunger arranged to slide in said shaft, and a cam for moving the plunger with reference to the shaft and die-roll to press a blank into the holder.

In testimony whereof I affix my signature.

HAROLD N. ANDERSON.